United States Patent [19]

Joubert et al.

[11] 4,380,101
[45] Apr. 19, 1983

[54] TIE HOOK, PARTICULARLY RUBBER SPRING HOOK

[75] Inventors: Antoine Joubert; Thierry Joubert; Bernard Bichard; Jean Joubert, all of Ambert, France

[73] Assignee: Joubert S.A., Ambert, France

[21] Appl. No.: 183,045

[22] Filed: Sep. 2, 1980

[30] Foreign Application Priority Data

Jul. 15, 1980 [FR] France ............................ 80 15612

[51] Int. Cl.³ .......................................... A44B 13/02
[52] U.S. Cl. .................................. 24/237; 24/255 SL; 24/255 BS; 24/16 DB
[58] Field of Search ................. 24/237, 300, 301, 255, 24/255 BS, 255 SL, 16 DB, 236

[56] References Cited

U.S. PATENT DOCUMENTS

| 2,269,662 | 1/1942 | Guyot | 24/248 R |
| 2,969,668 | 1/1961 | Aitchison | 24/237 |
| 3,204,636 | 9/1965 | Karimer et al. | 24/255 SL |
| 3,854,482 | 12/1974 | Laugherty et al. | 24/255 SL |
| 4,220,301 | 9/1980 | Jacobs et al. | 24/16 DB |

FOREIGN PATENT DOCUMENTS 958406  9/1949  France ................................. 24/300

Primary Examiner—Robert A. Hafer
Attorney, Agent, or Firm—Fleit, Jacobson & Cohn

[57] ABSTRACT

The invention relates to a hook for rubber springs etc., suitable for attachment to a cable or a strap. The hook comprises an anchorage block for attachment to the cable or to the strap and a deformable retaining loop having substantially the shape of a U, of which one arm has an end integral with the anchorage block and the other arm of which has at its free end a nose turned towards the base of the U, there being a hooking element integral with the anchorage block in which the nose can be engaged or disengaged to effect the closure or opening respectively of the hook.

9 Claims, 6 Drawing Figures

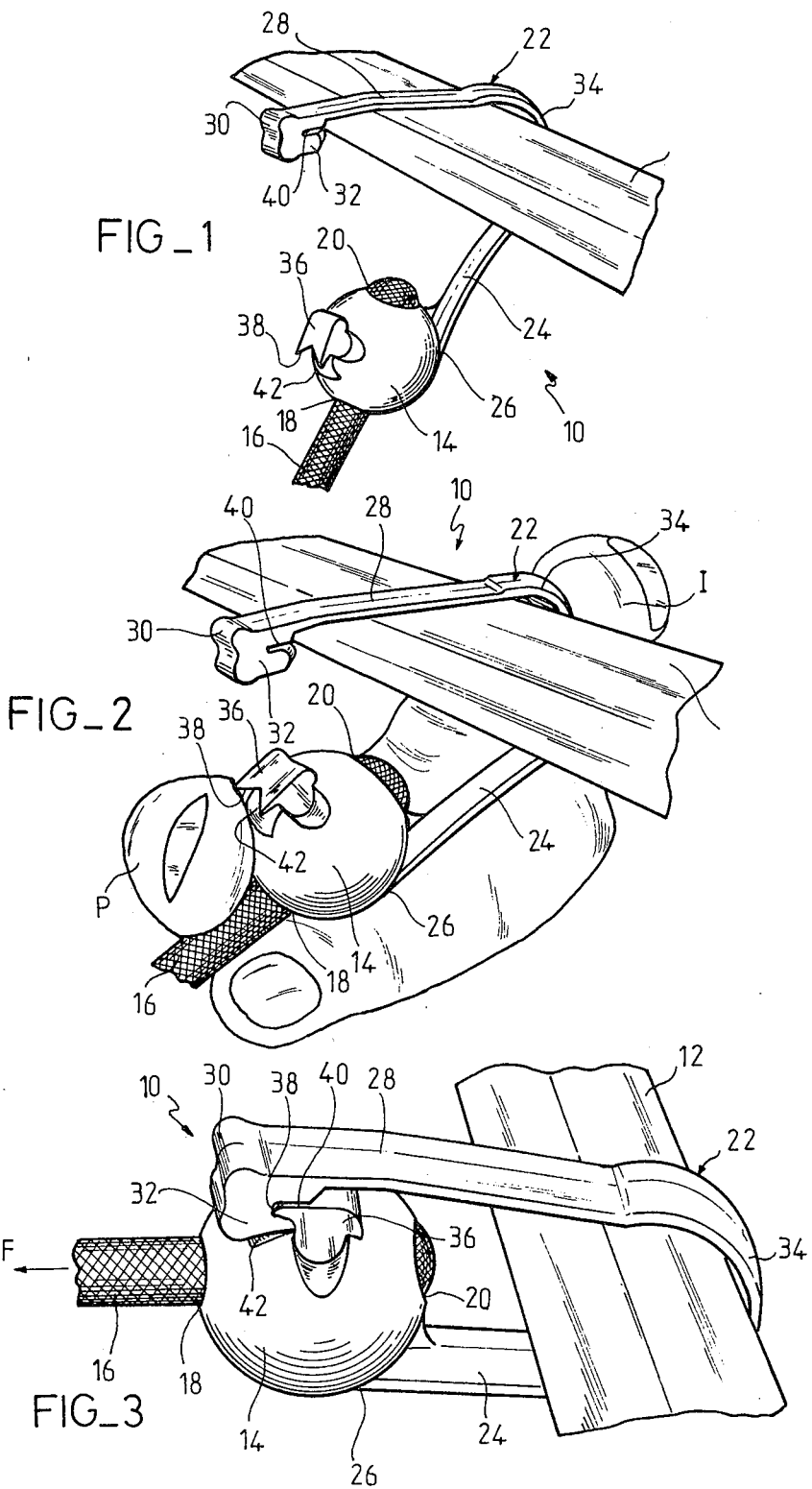

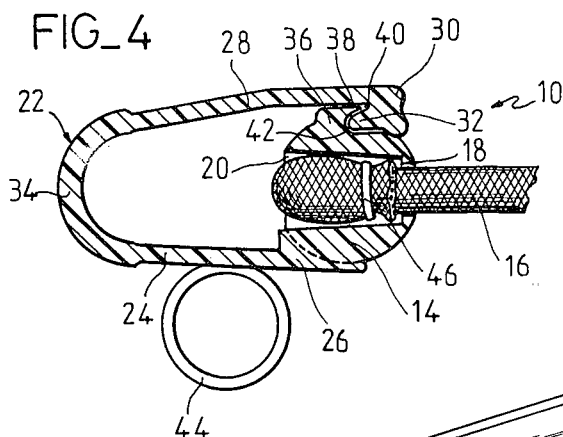
FIG_4
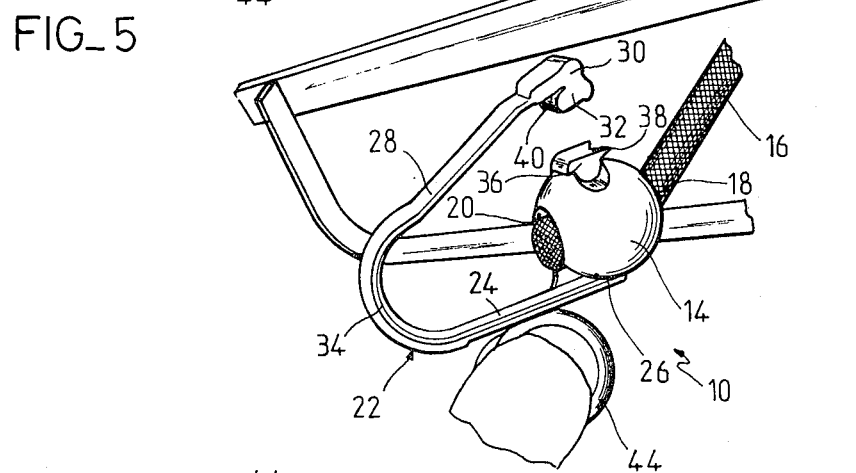
FIG_5
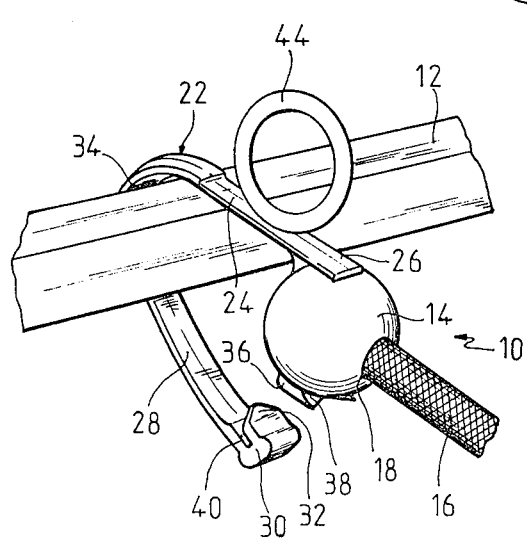
FIG_6

TIE HOOK, PARTICULARLY RUBBER SPRING HOOK

The invention relates to a hook for hitching a tie, especially an elastic tie, such as an elastic cable or strap and particularly for hitching a rubber spring.

Hooks which are attached to a cable or a rigid elastic strap, e.g., hooks attached to luggage retaining nets or mono- or multi-filament luggage straps, are generally formed by a simple bent steel wire, which may become prematurely disengaged and which may injure the user.

The invention aims to provide a hook which cannot become unintentionally disengaged, whilst remaining easy to use and to remove, preferably a hook, the opening of which requires the application of a force counter to the pull of the tie upon the hook.

The hook according to the invention has a part forming an anchorage block to the tie and a part forming an open hooking loop, one arm of which is integral with the anchorage block and the other arm of which is free and can be moved away from or towards the block laterally and has a gripping means for engagement with the block to close the loop.

The gripping means of the free arm is preferably a nose directed towards the base of the loop and adapted to enter a recess on the block. The block has a passage in which the tie is received and the said recess of the block is oriented to extend in the opposite direction to the direction of introduction of the tie into the said passage.

Other characteristics and advantages of the invention will be better understood from reading the description which now follows and which refers to the accompanying drawings given solely by way of illustration, and wherein:

FIG. 1 is a perspective view of a hook according to a first embodiment of the invention, shown in the open position;

FIG. 2 is a perspective view showing the hook of FIG. 1 in the open position at a stage before its closure;

FIG. 3 is a perspective view showing the hook of FIGS. 1 and 2 in the closed position;

FIG. 4 is a sectional view of a hook according to another embodiment of the invention, shown in the closed position;

FIG. 5 is a perspective view showing the hook of FIG. 4 in the open position; and FIG. 6 is another perspective view of the hook of FIGS. 4 and 5.

FIGS. 1 to 3 illustrate a hook 10 according to the invention intended to be attached to a bar 12 forming part, e.g., of a motor vehicle roof rack.

The head 10 comprises an anchorage block 14, which may be of any shape, but as shown is generally spherical, provided with a through passage oriented along a diameter of the sphere and intended for the anchorage of an elastic cable 16. This through passage issues to the outside by opposed circular apertures 18 and 20, the aperture 18 having a smaller diameter than the aperture 20 to permit the end of the cable 16 to be folded and attached to itself to prevent its escape from the anchorage block 14.

The hook 10 also comprises a part forming a retaining loop 22 having substantially the shape of a U and comprising an arm 24, the end 26 of which is integral with the anchorage block 14, and an arm 28, the end 30 of which is free and provided with a turned-back nose 32 directed towards the base of the U. The arms 24 and 26 are connected together by a substantially circular rounded part 34 forming the actual loop.

The arms of the loop are flat and thick and bear flat against the anchorage block 14, which is located between the arms.

The nose 32 can be engaged in or disengaged from a recess 42 in the block in order to effect the closure of the hook (FIG. 3) or the opening of the hook (FIGS. 1 and 2) respectively.

The recess 42 is bounded on the nose side by a front wall 36 which, in the closed position of the hook (FIG. 3), engages like a catch in a space 40 included between the nose 32 and the arm 28 of the loop.

The recess 42 has a shape corresponding to that of the nose 32, but hollow, so that these two elements can co-operate closely in the closed position as illustrated in FIG. 3.

In the embodiment of FIGS. 1 to 3, the nose 32 has the shape of a point, or more precisely of a slightly obtuse angle oriented towards the base of the U. This point is contained in a plane perpendicular to the plane defined by the two arms 24 and 28 of the retaining loop 22. This ensures self-centering of the nose in the recess.

It will be observed that the flange 38 of the wall 36 exhibits a vee-shaped cut similar to the shape of the point of the nose 32.

The hooking element 36 and the point of attachment of the end 26 of the arm 24 with the anchorage block 14 are arranged symmetrically on the sphere with reference to the through passage so that, in the closed position of the hook (cp., FIG. 3), the two arms 24 and 28 of the U are substantially parallel with the through passage and therefore parallel with the direction of the cable 16.

The hook shown in FIGS. 1 to 3 is advantageously produced as a one piece moulding in a plastics material. The arms of the loop are rigid but the loop permits the free arm to be moved away so that the nose 32 can be engaged in (or disengaged from) the hooking element 36.

The device is used in the following manner.

The hook in the open position is engaged round the rack element 12 as shown in FIG. 1. The anchorage block 14 and the retaining loop 22 are then brought together manually by placing e.g., the thumb (P) on the anchorage block 14 and the index finger (I) on the rounded base 34 of the retaining loop so as to being the nose 32 closer to the hooking element 36, as shown in FIG. 2.

As soon as the nose 32 is positioned opposite the hooking element 36, the tension exerted by the thumb and index finger is relaxed so that the nose 32 enters the recess 42. It will be observed that the pointed shape of the nose 32 favours its centering within the recess 42. This also prevents any lateral unlocking of the hook 10 resulting from a lateral displacement of the nose 32 relative to the recess 42. It will be noticed in FIG. 3 that any force F exerted upon the hook 10 through the intermediary of the cable 16 tends to favour the co-operation of the nose 32 and of the hooking element 36 and that, in order to disconnect the nose 32 from this hooking element 36, it is necessary to exericse upon the retaining loop a force directed in the opposite direction to the force F.

FIGS. 4 to 6 illustrate a hook which differs from that of FIGS. 1 and 3 solely by the presence of a handle ring 44 attached to the arm 24 which is connected to the anchorage block 14. The function to this ring is to facilitate the traction of the cable 16 as shown e.g., in FIG. 5.

It will be observed in the section, FIG. 4, that the end of the cable 16 is folded upon itself and maintained by means of a metal binding 46. With this arrangement it is impossible for the cable to escape from the anchorage block 14.

The invention is not limited to the embodiment described and illustrated, to which the expert may apply variants of detail.

Thus the anchorage block, the shape of which is not limitative but is preferably chosen from among the shapes easy to obtain by moulding, may have e.g., the shape of a conic frustum or of a pyramidal frustum. The block may also have various recesses or lateral flats.

The invention is also not limited to any particular method of anchorage of the cable to the anchorage block: Metal binding or ring on the folded end of the cable, ring crimped on the straight and unfolded end of the cable, etc.

What is claimed is:

1. A hook for hitching a tie, said hook comprising:
   an anchorage block having a through passage to receive the tie;
   a recess formed in the anchorage block; and
   an open hooking loop having two arms substantially symmetrical with reference to the through passage, a base spaced from the anchorage block and serving to join said arms to form the loop, said loop being substantially coaxial with said through passage, one arm of the loop being integral with the anchorage block and the other arm of the loop being free and being movable laterally away from or towards the block and having a nose directed towards the base of the loop and adapted to enter the recess of the block for engagement with the block to close the loop, said nose being pointed and the recess having a corresponding but hollow shape to cause self-centering of the nose in the recess.

2. A hook according to claim 1, wherein the recess is bounded on the side of the said other arm by a front wall having a vee-shaped cut-out edge for the introduction of the nose into the recess.

3. A hook according to claim 1, wherein the block is located between the said arms.

4. A hook according to claim 1, wherein the said arms are flat.

5. A hook according to claim 4, wherein the said arms bear flat against the block.

6. A hook according to claim 1, wherein the said recess of the block is turned in the opposite direction to the direction of introduction of the tie into the said passage.

7. A hook according to claim 1, wherein one of the said arms carries a handle ring.

8. A hook according to claim 1, wherein the block has the general shape of a sphere and the loop forms a U, the arms of which respectively terminate in two diametrically opposed zones of the sphere.

9. A hook according to claim 1, which is integrally moulded in plastics material.

* * * * *